United States Patent [19]

Carpentier

[11] 4,114,468
[45] Sep. 19, 1978

[54] DRIVE MEANS FOR ELECTRIC GENERATORS PARTICULARLY ADAPTED IN FLOATING POWER PLANT

[75] Inventor: Theodore Carpentier, Los Angeles, Calif.

[73] Assignee: Universal Power Corporation, Fresno, Calif.

[21] Appl. No.: 698,822

[22] Filed: Jun. 23, 1976

Related U.S. Application Data

[63] Continuation of Ser. No. 333,288, Feb. 16, 1973, abandoned.

[51] Int. Cl.² ............................................. F16H 57/00
[52] U.S. Cl. .................................. 74/410; 74/421 A; 74/661
[58] Field of Search .......................................... 74/410

[56] References Cited
U.S. PATENT DOCUMENTS

| 1,149,373 | 8/1915 | Lake | 74/661 X |
| 1,279,501 | 9/1918 | Bijur | 74/421 A |
| 1,342,797 | 6/1920 | Conti | 290/4 |
| 1,393,391 | 10/1921 | Cook et al. | 74/410 |
| 2,148,564 | 2/1939 | Kuhns | 74/410 |
| 3,196,714 | 7/1965 | Lundström | 74/410 |
| 3,397,591 | 8/1968 | DePescluse | 74/410 |

Primary Examiner—Benjamin W. Wyche
Assistant Examiner—Wesley S. Ratliff, Jr.
Attorney, Agent, or Firm—Albert M. Herzig; Edward C. Walsh

[57] ABSTRACT

An electric generator is driven by one or more steam turbines through gear train means, embodying one relatively large gear which serves the purpose of a flywheel, serving to stabilize the speed and voltage and frequency output of the generator. The system adapts itself particularly to conversion of the steam power plants of reserve vessels to floating, electric power generating stations by disconnection of the propeller shaft from the main or bull drive gear and installation of the electric generator.

6 Claims, 3 Drawing Figures

DRIVE MEANS FOR ELECTRIC GENERATORS PARTICULARLY ADAPTED IN FLOATING POWER PLANT

This is a continuation of application Ser. No. 333,288 filed on Feb. 16, 1973 now abandoned.

SUMMARY OF THE INVENTION

The invention relates to driving means for a driven unit, and more particularly, an electric generator from one or more prime movers. In the exemplary form of the invention as described herein, the prime movers are steam turbines which drive the electric generator through a gear train.

The invention primarily resides in the gear train. The gear train comprises a train or trains of gears which includes one relatively large, massive bull gear which rotates at a lower speed than the prime movers. This large, massive bull gear in the gear train serves the purposes of a flywheel as well as being a gear in the train. By reason of it, certain purposes are realized which are among the objects of the invention. In addition to the centrifugal flywheel effect of the large bull gear, damping is provided. The gear assembly facilitates the use of multiple prime movers at the power input end of the gear train or trains. Corollary advantages are realized as follows. No separate flywheel is needed. The system as described is superior for purposes of meeting torsional vibration requirements in rotating parts. The multiple prime movers drive the bull gear at a lower speed than the output speed of the generator shaft which realizes the effects described. There is speed reduction from one prime mover to the bull gear and speed increase from the bull gear to the output shaft.

A further particular objective of the invention is that it makes possible realization of the very significant advantage that the system or installation can be realized in an advantageous way simply by conversion of driving machinery in readily available reserve seagoing vessels equipped with steam power plants. The system of the invention is realized simply by disconnecting the propeller shaft in the power plant of the vessel and installing the electrical generator to be driven by the gear train already available. Many further objects are thus realized, providing corresponding or complementary advantages. A mobile, electric power generating station becomes available for producing power of about 8,125 kilivolt amperes at 13,800 volts and 60 cycles, for example. This mobile generating station becomes available with negligible capital cost. The mobility provides availability of the electric power quickly where needed. Ordinarily, the equipment is virtually new, dependable, and available at low cost. The system is easy to operate, maintain, and couple into existing distribution systems. Other advantages reside in the availability in the mobile power generating station itself of integral living quarters for crews, refrigerated cargo space, tanks, etc.

BRIEF DESCRIPTION OF THE DRAWINGS

Further objects and additional advantages of the invention will become apparent from the following detailed description and annexed drawings, wherein.

DESCRIPTION OF THE PREFERRED EMBODIMENT

Figure 1:
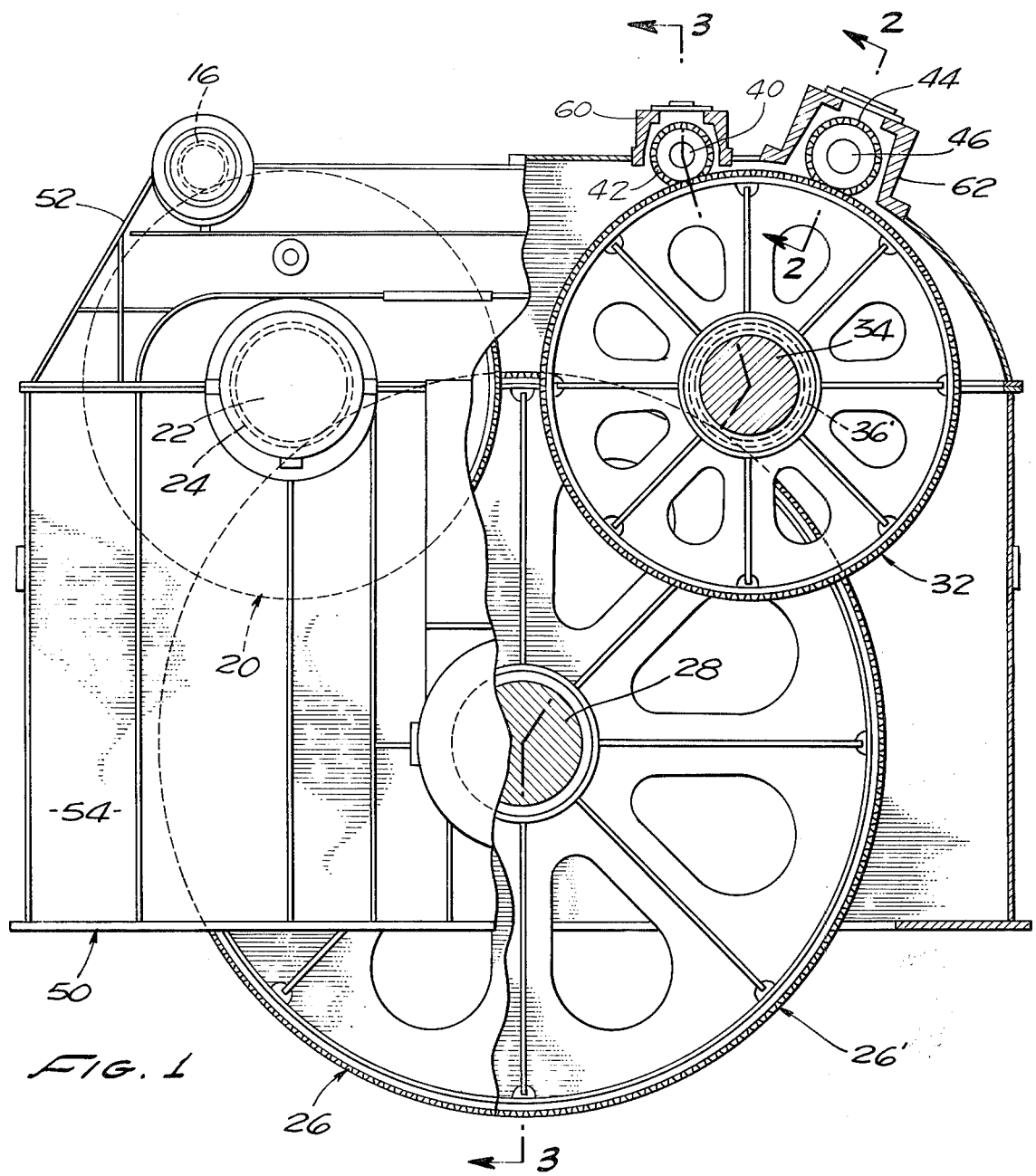
FIG. 1 is a view of a preferred form of the invention.

Typically, the power plants in the type of vessels referred to are plants comprising steam turbines. The appropriate boiler rooms and fire rooms are available for providing steam. FIG. 1 of the drawings illustrates a type of gear train for providing drive between a steam turbine and a propeller shaft. In the engine room is a steam turbine having an output shaft on which is a gear 16 which drives a larger gear 20. Gear 20 is on shaft 22 journalled in appropriate bearings suitably mounted in the engine room. Numeral 24 designates a smaller gear on shaft 22. Numeral 26 designates a relatively large massive gear on shaft 28 which in the original installation in the vessel is connected to the propeller. In the system being described, the propeller shaft is disconnected. The large massive gear appropriately provides a flywheel which is in a position in the gear train to rotate at a lower speed than that of turbine 10, and a lower speed than that of the output shaft. In other words, the gear train involves both speed reduction (to the bull gear) and speed increase to the output shaft. In this way the flywheel and damping effects are realized.

Numeral 32 designates a further gear which is on a shaft 34 suitably journalled which has a smaller gear on it as designated at 36 which meshes with large gear 26. The installation includes a second turbine as a prime mover which may be one utilizing steam at a different pressure than turbine 10 and operating at a different speed. The shaft of this turbine is designated at 40 having on it a gear 42 which meshes with gear 32, as shown. Numeral 44 designates another gear on shaft 46. This gear meshes with a gear 32 as shown. Shaft 46 serves to drive the electric generator that is installed at the output shaft. This drive may be direct or through a further gear train. Preferably, but by way of example, the generator may be one having the particular characteristics referred to in the foregoing.

The gear train as so far described may be wholly or partly enclosed in a housing designated generally at 50 having a top part 52 and a lower part 54. Numeral 60 designates a housing for gear 42 and shaft 40. Numeral 62 designates a housing for gear 44 and shaft 46.

Figure 2:
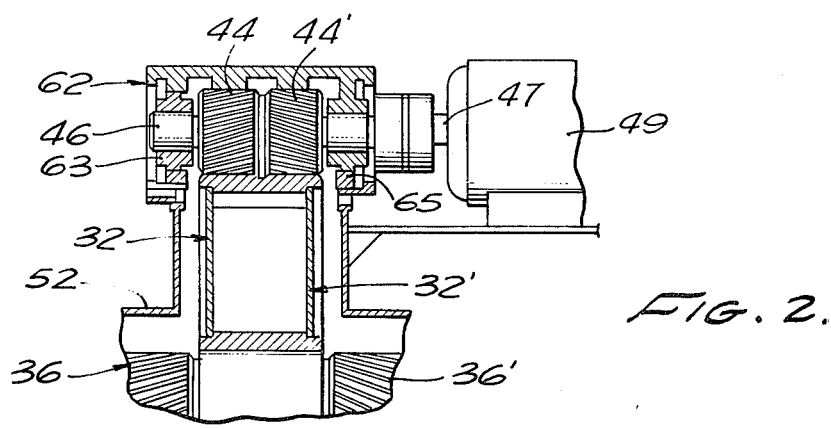
FIG. 2 is a sectional view taken along the line 2—2 of FIG. 1.
Figure 3:
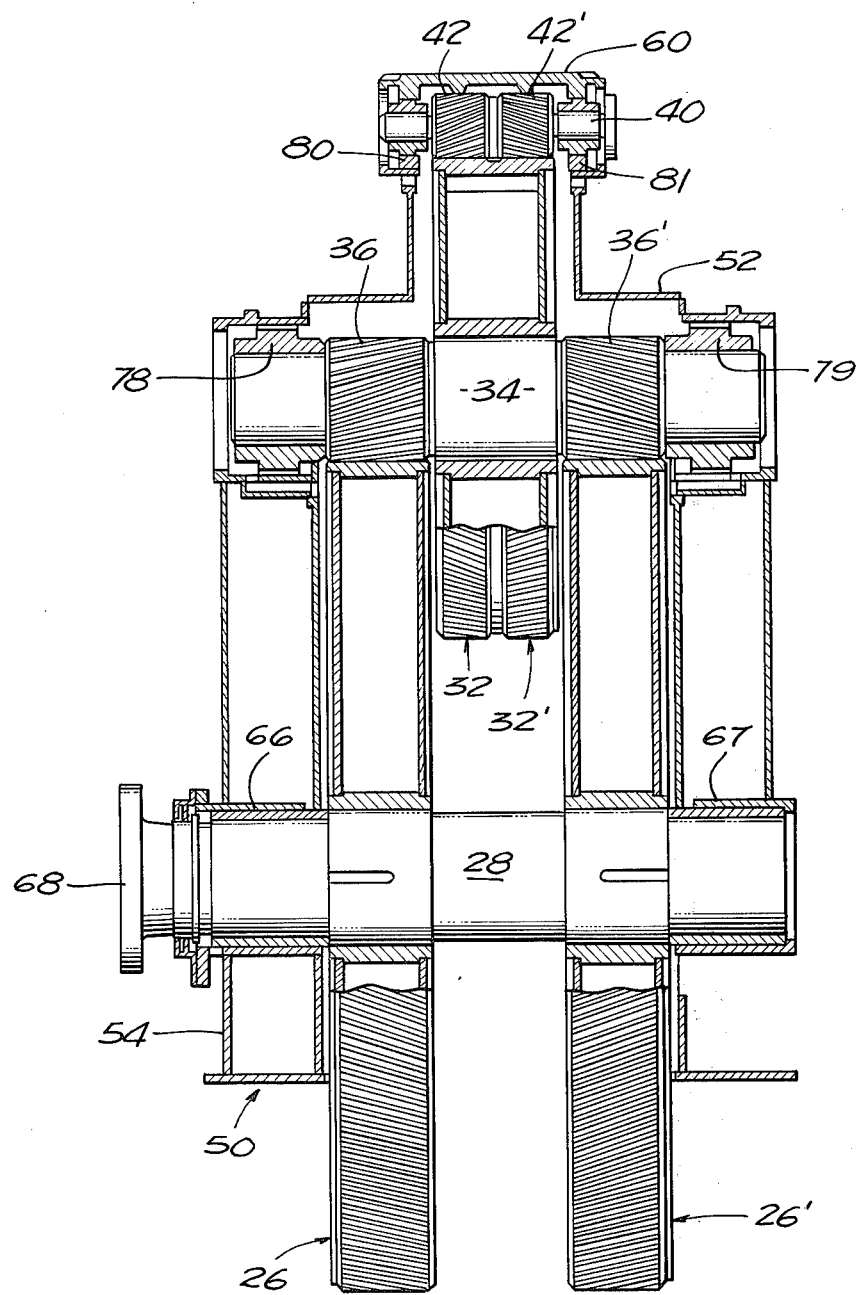
FIG. 3 is a sectional view taken along line 3—3 of FIG. 1.

All of the gears involved are double, as illustrated in the sectional views, FIGS. 2 and 3. Shaft 28 is journalled in bearings 66 and 67 and has an end flange 68 which is disconnected from the propeller shaft. At the other end of shaft 28, it may be sealed if desirable.

Gears 26 and 26' are double and of the herringbone type, as shown, being spaced apart with gears 32-32' between them. Of course, other types of gears may be used.

Shaft 34 is journalled at the ends in bearings 78 and 79. Gears 36 and 36' are of the herringbone type as shown. Gears 42-42' are of the double herringbone type. Shaft 40 is journalled in bearings 80 and 81 in housing 60.

Gears 44-44' (FIG. 2) are the double herringbone type and mesh with gears 32-32'. Shaft 46 is journalled in bearings 63 and 65 in housing 62.

Shaft 46 is coupled to shaft 47 of the electrical generator designated at 49. From the foregoing, it will be observed that there are two prime movers in the form of steam turbines one designated at 16 and the other driving shaft 40. Both of these prime movers drive the main bull gears 26-26' and also the generator 49. Gears 26-26' rotate at a lower speed than the prime movers and the driven generator. That the gears 26-26' serve as a flywheel is readily apparent as is the manner in which the other specific objects of the invention as outlined in the foregoing are realized.

From the foregoing, the technique of conversion of the available seagoing vessel to a mobile, electric power generating station will be readily appreciated. The invention has significance stemming from the steadily increasing demands for electric power without adequate resources to meet the demands. Generators can be installed having characteristics and capacities appropriate to particular demands at localities where power sources are needed.

This serves all of the advantages as outlined in the foregoing. Of particular significance is the gear train in which the large, massive bull gear or gears is available to serve as a flywheel rotating at a lower speed than the prime mover or movers and at a lower speed than the driven generator. The flywheel characteristics are particularly advantageous in the drive of high speed turbines, since it is desirable that the generator speed be kept uniform for purposes of steady hand uniform power output.

The foregoing disclosure is representative of a preferred form of the invention and is to be interpreted in an illustrative rather than a limiting sense, the invention to be accorded the full scope of the claims appended hereto.

What is claimed is:

1. A gear train assembly for interconnecting the shaft of a prime mover in driving relationship with a second shaft, comprising:

a bull gear, said bull gear being relatively large and massive with respect to all other gears in said gear train assembly;

first gear means connecting said prime mover shaft in driving relationship with said bull gear, said first gear means being a speed reducer operable to drive said bull gear at a rate of rotation lower than the rate of rotation of said prime mover shaft; and second gear means connecting said bull gear in driving relationship with said second shaft, said second gear means being a speed increaser operable to drive said second shaft at a rate of rotation higher than the rate of rotation of said bull gear, said bull gear having substantially greater inertia than the other gears sufficient to operate as a flywheel to stabilize the speed and to have the capability of providing torsional vibration damping to isolate such vibration from the second shaft, said prime mover shaft is the output shaft of a steam turbine;

said bull gear is a ship's bull gear of the type used in driving a ship's propeller; and said second shaft is the input shaft of a generator, having a stabilized output frequency.

2. The invention defined in claim 1 including an alternating current generator, said second shaft being the input shaft of the generator, the generator having a stabilized output frequency.

3. The invention defined in claim 2 wherein said gear, train assembly, shafts and bull gear being incorporated in a ship's power plant constituting a mobile power station capable of serving shore installation needs.

4. The invention defined in claim 3 including the output shaft of a second prime mover connected in driving relationship with said second gear means whereby said second gear means is driven by both the output shaft of said second prime mover and said bull gear, said bull gear having sufficient inertia and torsional vibration damping capability to absorb and isolate said second shaft from vibrations and erratic movements of the output shafts of both said first and second prime movers.

5. A gear train assembly for connecting the output shaft of a prime mover in driving relationship with a second shaft, comprising means including bull gear means connecting said output shaft in driving relationship with said second shaft, said bull gear means being relatively large and massive with respect to all other gears in said gear train assembly and having sufficient inertia to operate in said gear train assembly as a flywheel to stabilize the speed at which said second shaft is driven, said gear means connecting said output shaft in driving relationship with said bull gear means and being a speed reducer operable to drive said bull gear means at a rate of rotation lower than the rate of rotation of said output shaft, said gear means also connecting said bull gear means an alternating current generator on said second shaft in driving relationship with said second shaft and being a speed increaser operable to drive said second shaft at a rate of rotation higher than the rate of rotation of said bull gear means, said bull gear means including a pair of spaced double gears, said gear means including smaller spaced double gears meshing with said bull gear means, and gear means coaxial with said smaller double gear means positioned between the spaced double gears of said bull gear means.

6. The invention defined in claim 5 wherein said second shaft is the input shaft of a generator, said bull gear means having sufficient inertia to provide torsional vibration damping capability to stabilize the output frequency of the generator.

* * * * *